THREE TUBE COLOR PROJECTION SYSTEM WITH SKEW CORRECTION

Filed Dec. 7, 1956 2 Sheets-Sheet 1

INVENTOR.
Lewis I. Mengle
BY
[signature]
ATTORNEY

INVENTOR.
Lewis I. Mengle
BY
[signature]
ATTORNEY

United States Patent Office 2,989,584

Patented June 20, 1961

2,989,584

THREE TUBE COLOR PROJECTION SYSTEM WITH SKEW CORRECTION

Lewis Irwin Mengle, Lancaster, Pa., assignor to Radio Corporation of America, a corporation of Delaware Filed Dec. 7, 1956, Ser. No. 626,892

7 Claims. (Cl. 178—5.4)

This invention relates to television image-reproducing systems and, particularly, to the correction of trapezoidal distortion of the type encountered when component color images produced by a plurality of kinescopes are projected in registry onto a common viewing screen.

In optical projection systems the plane of the image to be projected ordinarily is parallel to the plane of the viewing screen and normal to the optical axis of the lens system. If either of these conditions is not met, the projected image will be a distorted portrayal of the original image. For example, if one side of the viewing screen is closer to the projector than the other (as when the image plane and viewing screen are not parallel), the shape of the projected image will be trapezoidal rather than rectangular. The image portion falling on the screen section closest to the projector will be smaller than the portion falling on the more distant screen section, because of the shorter projection distance. This is a phenomenon which is well known in the art of geometrical optics.

If the plane of the viewing screen is at an angle other than perpendicular to the optical axis of the projection system, compensation for the error distortion is necessary in order that a projected image on the screen be free of trapezoidal error. This error is commonly known as "keystone error."

One form of color television image reproduction, in which projection technique is employed, requires a group of two or more individual image projectors, the number depending on the number of different component colors to be represented in the composite color picture. The images from the separate projectors, each representative of the information concerning its respective color, are projected onto a common area on a viewing screen. Each corresponding elemental area of the respective projected images must fall at precisely the same place on the screen, or in other words, the respective color images must be in optical registry at the screen plane so that, by the additive color process, the eye may see the resultant mixture of the component color images as a single image in natural color.

One of the projectors in the group may have its optical axis perpendicular to the viewing screen at a point in the exact center of the projected image area. It is therefore evident that unless resort is had to relatively complex optical registration systems, any remaining projector in the group must be positioned such that its optical axis approaches the center of the projected image area at an angle other than 90° from the screen plane. From the foregoing it will therefore also be apparent that, unless compensation means are used, a keystone error will be present in the image projected from each projector whose optical axis is not perpendicular to the plane of the viewing screen.

It is, therefore, an object of the present invention to provide means for compensating for keystone error, or trapezoidal distortion, in a television system involving a plurality of cathode ray tubes whose images are to be registered and in which an individual tube is positioned such that its optical axis is at an angle with respect to the axis of another tube.

In general, and as applied to a multi-tube projection system, for example, the present invention provides keystone-error compensation by introducing a controlled unbalance in the electron-beam deflection field of a cathode ray tube projector, such that the amount of deflection of the side of the image having the longer projection distance will be reduced by an amount necessary to change the shape of the projected image area from a trapezoid to a rectangle.

This invention may be used with standard deflection yoke apparatus having one winding whose magnetic field deflects the electron beam in a vertical direction and another winding whose field deflects the beam in a horizontal direction. Each of said windings is comprised of two coils, placed on oposite sides of the electron-beam path.

In accordance with a specific form, the present invention achieves the field unbalance simply and inexpensively by shunting one of the two coils of the appropriate deflection winding with a resistor. The value of the shunt resistor is such that deflection current through the shunted coil is reduced sufficiently to reduce the field on the shunted-coil side of the electron beam path by the correct amount to reduce the deflection on the long-projection side of the image to change the image shape from a trapezoid to a rectangle.

In order that the practical aspects of the invention may be fully appreciated and readily put to practice, an illustrative embodiment of the invention is described hereinafter with reference to the accompanying drawings, in which.

Figures 1, 2, 3:
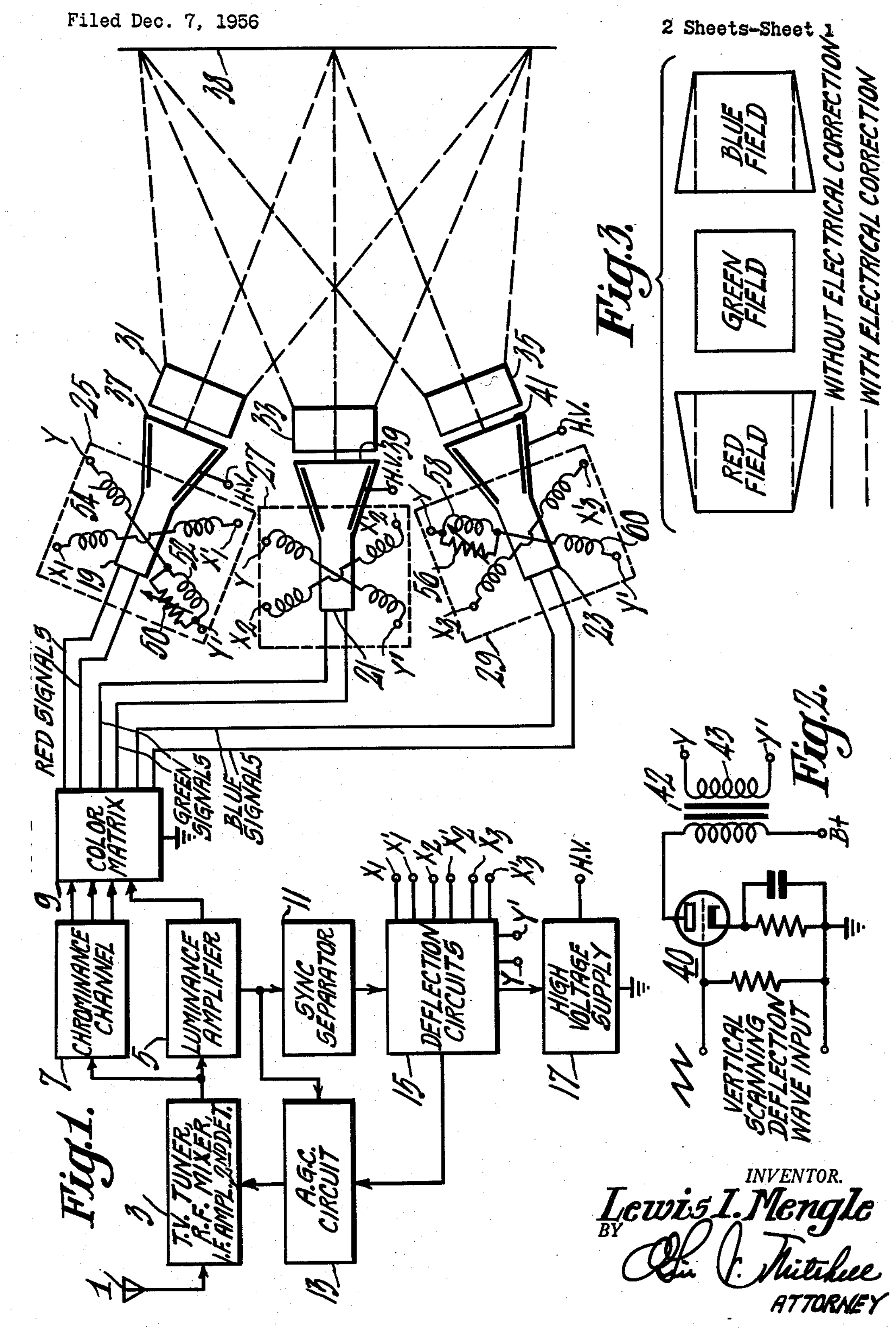
FIGURE 1 illustrates, by way of a block diagram, a color television receiving system embodying the present invention.
FIGURE 2 is a schematic diagram showing a source of vertical deflection energy.
FIGURE 3 is a diagram which shows geometrically the trapezoidal error correction achieved in the practice of the invention.

Referring to the drawing, and particularly to FIGURE 1, there is shown a color television receiver of well-known form such, for example, as that described in "Practical Color Television for the Service Industry," published by RCA Service Company, Inc., Camden, New Jersey, second edition, April 1954. While the specific form of apparatus for processing the received signal does not constitute a part of the present invention, it may be noted that the receiver may be adapted to operate upon signals made up in accordance with standards set by the Federal Communications Commission on December 17, 1953.

In accordance with those standards, information regarding the luminance of a television scene is transmitted by a luminance signal which is an amplitude-modulation of a main carrier wave with video signals proportional to the elemental brightness values of the scene, and the chrominance information is transmitted by a phase and amplitude-modulated subcarrier wave. The instantaneous phase of the chrominance subcarrier wave with respect to a color reference phase is indicative of a selected hue, and the instantaneous amplitude of the wave is proportional to the degree of saturation of the hue.

The antenna 1 in the apparatus of FIGURE 1, is adapted to intercept the television signal and to apply it to the input terminals of a television tuner section 3 which may be understood as including the usual radio-frequency, mixer, intermediate frequency and second or video detector stages.

The detected signal information is applied simultaneously to a chrominance channel 7 and to a luminance signal amplifier 5. Color difference signals are derived from the chrominance subcarrier wave and applied along with the amplified luminance signal to a matrix 9. The matrix 9 is adapted to combine the signals received from the chrominance channel and from the luminance channel in such manner as to provide color signals which may be applied to image reproducing apparatus, such as the three-kinescope projection system shown in FIGURE 1.

Signals which may or may not be of the same polarity as those applied to a matrix 9 are also derived from the load circuit of the luminance amplifier 5 and applied to a sync separator 11 and an AGC circuit 13 of the receiving sysem. The AGC circuit serves conventionally to control the gain of one or more of the signal amplifying stages in such manner as to compensate for variations in the strength of received signals. The synchronizing signals are utilized in a well known manner to synchronize the deflection apparatus 15 of the receiving system with that of the transmitting system.

Still referring to FIGURE 1, signals corresponding to the red, green, and blue component color information, respectively, are available at the output of the color matrix 9. These color signals are applied, respectively, to the projection kinescopes 19, 21, and 23. Each component color signal is, specifically, applied to a beam-current-controlling element in its associated kinescope in order that the intensity of the beam, as it impinges upon its fluorescent target, will be in proportion to the amplitude of its color-information signal. The targets 37, 39, and 41 comprise phosphor materials which will produce red, green, and blue light emission, respectively, in response to electron impingement. Alternatively, all three tubes may have identical target material having white emission, each tube being provided with a suitable color filter in its optical path. Hereinafter, the red-image kinescope will be referred to as the red kinescope; the green-image kinescope, the green kinescope; and the blue-image kinescope, the blue kinescope.

Each kinescope has its own deflection yoke; yoke 25 for the red kinescope 19, yoke 27 for the green kinescope 21, and yoke 29 for the blue kinescope 23. Each yoke comprises two windings in the standard fashion, one for producing horizontal deflection of the electron beam and the other for producing vertical deflection. The deflection circuit 15 is shown to have separate output terminals $X_1$ and $X'_1$, which connect to the horizontal winding of the yoke 25; terminals $X_2$ and $X'_2$, which connect to the horizontal winding of the yoke 27; terminals $X_3$ and $X'_3$, which connect to the horizontal winding of the yoke 29; and terminals Y and Y', which connect to the vertical windings of all three deflection yokes. The deflection circuit 15 may comprise three separate horizontal deflection wave sources of any suitable type, having separate linearity and size control means for "squeezing" the horizontal lines into registry, or alternatively, it may comprise only one source with means for varying the linearity and size individually for each of the three horizontal deflection windings. In any event, the linearity and size of each of the horizontal deflection wave sources is preferably individually controllable. The individual horizontal size controls may be necessary in order that the three yokes need not be selected for similar characteristics. Any suitable type of vertical deflection wave source may be used to supply vertical scanning potential to the terminals Y and Y'. High positive operating voltages for the kinescopes may be derived from the deflection circuits in a conventional fly-back power supply 17. The terminal HV of the high voltage power supply 17 is connected to the terminals marked HV on each of the three kinescopes.

FIGURE 2 shows one form of vertical deflection wave output amplifier 40 suitable for supplying the above-mentioned vertical scanning deflection energy. Connections for the terminals Y and Y' of the secondary winding 43 of vertical output transformer 42 are made to the Y and Y' terminals of the vertical deflection windings of all three yokes, as shown in FIGURE 1. It is sometimes necessary to connect a variable resistance (not shown) in series with each vertical yoke winding, thereby, providing individual size control. This feature eliminates the necessity of yoke selection.

Referring again to FIGURE 1, the red, green and blue kinescopes are positioned with respect to a viewing screen 38 so that their respective horizontal axes intersect at the center of the image area on the viewing screen. An optical system for projecting the image appearing on each kinescope is positioned between the image surface of each kinescope and the viewing screen. These optical systems, indicated diagrammatically by reference numerals 31, 33 and 35 may comprise simply suitable lenses for focusing the kinescope images on the viewing screen 38.

Assuming, for the purpose of explanation, that no error correction is applied to the vertical deflection of any of the kinescopes, and that the shape of each image area as it appears on the face of the kinescopes is rectangular, it will be apparent from FIGURES 1 and 3 together, that the shape of the uncorrected red image, as projected onto the screen 38, is a trapezoid with the right side longer than the left, and the uncorrected blue image is a trapezoid having its left side longer than the right. The result is that the three component color images are misregistered. Hence, the present invention provides means for pre-distorting the shape of the images of the red and blue kinescopes to trapezoids whose sides are oppositely proportional to the sides of the uncorrected projected images, so that the projected images are rectangular in shape as they appear on the screen.

Such a trapezoidal image area may be scanned on the kinescope face by causing the vertical deflecting field to be weaker on the short-scan side than on the other side by an amount determined by the difference in the length of the two sides.

Figure 4:
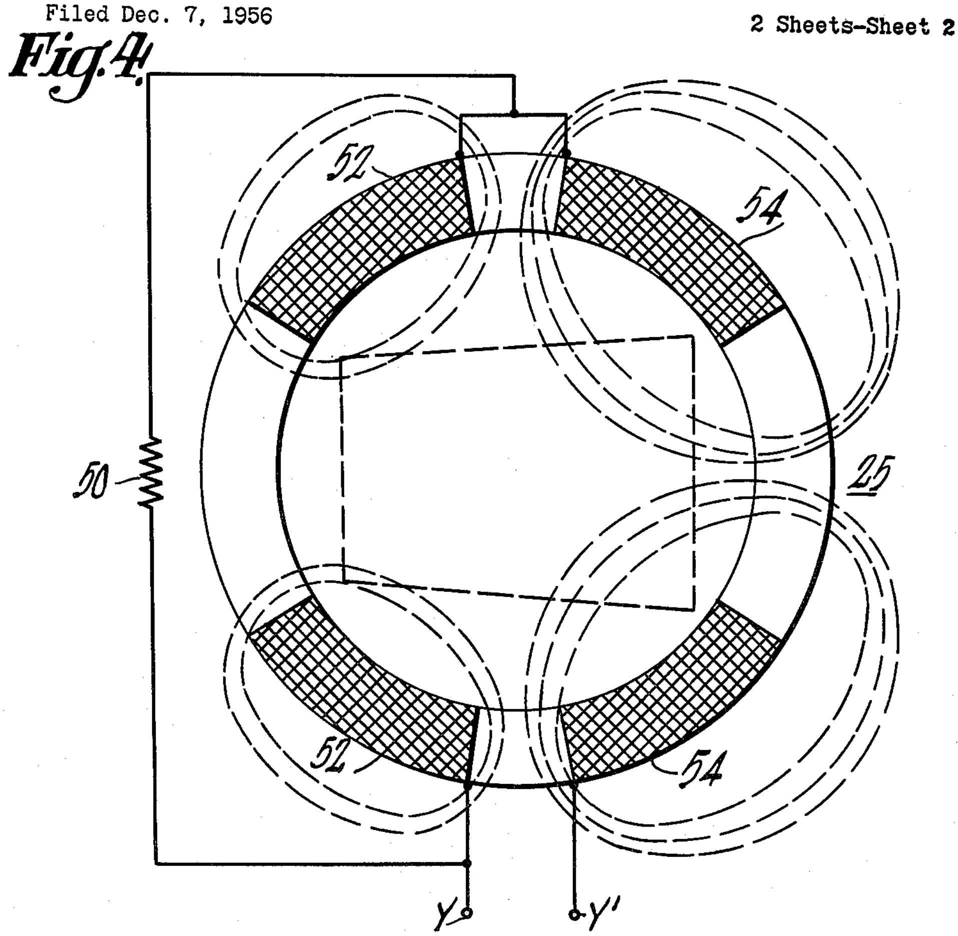
FIGURE 4 shows a field distribution pattern produced by a yoke winding having one coil shunted by a resistor.

This imbalance in field-strength is accomplished according to the form of the invention shown in FIGURE 1, in which a variable resistor 50 is shunted across one coil 52 of the vertical deflection winding 25 associated with the red kinescope 19. By shunting the coil 52 with a resistor, less deflecting current flows through the coil 52 than through the other vertical-deflecting coil 54. As a result, a smaller field is set up by the coil 52 than by the coil 54. Although it is true that a composite field results from the interaction of the fields produced by both coils 52 and 54, the composite field is weaker in the region of the coil 52 than in the region of the coil 54. FIGURE 4 illustrates in detail the magnetic field patterns produced by the two coil sections of the yoke 25 and the resultant trapezoidal scanning area. As the electron beam is deflected horizontally it therefore passes through a vertical deflection field of varying strength. When deflected into the region of stronger field (near the coil 54 side) the beam will be deflected vertically by a larger amount than when deflected horizontally to the opposite side near the coil 52. It can be seen from the drawing that the projection distance from the red kinescope to the screen 37 is greater on the side next to the green kinescope 21 than on the other side. It is necessary, therefore, that the vertical deflection field be reduced on the side nearer the green kinescope to provide the compensation required to form a trapezoidal image-area on the face of the red kinescope which will project onto the screen as a rectangular area. The shunting resistor 50 is variable to permit adjustment of the amount of deflecting current to be shunted around the coil 52, and thus permit adjustment of the compensation required to achieve registration of the projected red image with the normally rectangular projected green image.

Deflection compensation is provided for the blue in a manner similar to that described for the red kinescope by means of the variable resistor 56, which is in shunt with the coil 58 of the vertical deflection winding 29.

Figure 5:
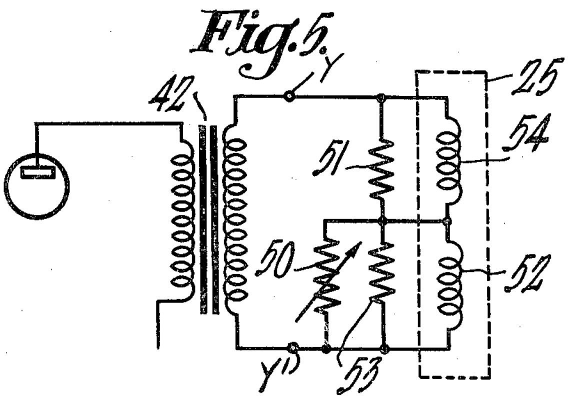
FIGURE 5 shows in detail an embodiment of the invention employed in conjunction with a standard vertical deflection winding.

Referring now to FIGURE 5, there is shown a schematic diagram of a typical vertical deflection circuit embodying the invention and having conventional individual damping resistors 51 and 53 in shunt, respectively, with the coils 52 and 54 of the vertical deflection winding 25. It is well known that the energy stored in the vertical deflection winding during the scanning period is discharged during retrace time through a damping resistor in shunt with each of the coils of the winding. The resistance value normally used to dissipate the stored energy, however, is several times higher than the value required to shunt sufficient current away from the deflection coil during scanning time to substantially alter the deflection path of the electron beam in accordance with the present invention. The resistor 50, having a value several times less than the value of resistor 53, is, therefore, provided. It will be apparent that, where the resistor 50 is much smaller than the resistor 53 with which it is in parallel, it is possible to omit the resistor 53. The resistor 50 would then perform the dual functions of reducing the deflection current through the coil 52 relative to the current flow through the coil 54, according to the invention, as well as absorbing the stored energy of the coil 52 during retrace.

Having thus described the invention, what is claimed is:

1. In an electromagnetic deflection system for use in conjunction with a cathode ray tube having a target and means for directing an electron beam along a path toward such target, apparatus comprising, a first magnetic field-producing winding positioned to produce a first magnetic field transverse of the path of said electron beam, a second magnetic field-producing winding position to produce a second magnetic field transverse of the path of said electron beam and at an angle with respect to said first magnetic field, one of said windings comprising first and second deflection field-producing portions oppositely positioned with respect to each other on each side of said electron beam path, resistance means connected in shunt with only said first field-producing portion to reduce the current flow through said shunted portion relative to the current flow in said second portion thereby to cause a difference in strength between the magnetic fields produced by said first and second field-producing portions of said winding, such that said beam is deflected a lesser amount by the field of said first field-producing portion than the amount which it is deflected by the field of said second field-producing portion whereby said beam is caused to scan a trapezoidal raster on said target.

2. The structure according to claim 1 in which the resistance means is variable thereby to control the amount of difference in strength between the magnetic fields produced by said two field-producing portions of said winding.

3. In an electromagnetic deflection system for use in conjunction with a cathode ray tube having a target and means for directing an electron beam along a path toward such target, apparatus comprising a first magnetic field-producing winding positioned to produce a first magnetic field transverse of the path of said electron beam, a second magnetic field-producing winding positioned to produce a second magnetic field transverse of the path of said electron beam and at an angle with respect to said first magnetic field, one of said windings comprising first and second deflection field-producing portions oppositely positioned with respect to each other on each side of said electron beam path, a first resistance means connected in shunt with only said first field-producing portion, a second resistance means connected in shunt with only said second field-producing portion, said first resistance means having a value at least three times less than the value of said second resistance, thereby to reduce the current flow through said first field-producing portion relative to the current flow in said second field-producing portion thereby to cause a difference in strength between the magnetic fields produced by said first and second field-producing portions of said winding, such that said beam is deflected a lesser amount by the field of said first field-producing portion than the amount which it is deflected by the field of said second field-producing portion whereby said beam is caused to scan a trapezoidal raster on said target.

4. Color television image reproducing apparatus of the type in which component color images are projected onto a viewing screen in register, said apparatus comprising: a plurality of image-producing kinescopes, each having a target and means for directing an electron beam along a path toward such target; means operatively connected to said kinescopes for modulating said electron beams respectively with video signals representative of said different component color images; an optical projection system for projecting the images produced by said kinescopes substantially in register onto said viewing screen, at least one of said kinescopes being positioned such that the optical axis of its projected image is at an angle with respect to the perpendicular to the plane of said viewing screen thereby causing an image-registration error between the image produced by said kinescope and the image produced by a kinescope whose projected optical axis is normal to said plane; vertical and horizontal deflecting means associated with each of said kinescopes for producing a two-dimensional deflection of the electron beam therein, at least one of said deflecting means having first and second magnetic-field producing windings disposed on opposite sides of the electron beam path of said first named kinescope, and a resistance element connected in shunt with said first winding only to cause less current to flow in said first winding than in said second winding to cause the magnetic field on one side of said beam path to differ from the magnetic field on the other side of said beam path, thereby to alter the shape of the raster produced by said two-dimensional deflection of the electron beam of said first named kinescope in an amount equal to and opposite from said image registration error to provide corrective compensation for said error.

5. Color television image reproducing apparatus of the type in which component color images are projected onto a viewing screen in register, said apparatus comprising: a plurality of image-producing kinescopes, each having a target and means for directing an electron beam along a path toward such target; means operatively connected to said kinescopes for modulating said electron beam respectively with video signals representative of said different component color images; an optical projection system for projecting the images produced by said kinescopes substantially in register onto said viewing screen, at least one of said kinescopes being positioned such that the optical axis of its projected image is at an angle with respect to the perpendicular to the plane of said viewing screen thereby causing an image-registration error between the image produced by said kinescope and the image produced by a kinescope whose projected optical axis is normal to said plane; vertical and horizontal deflecting means associated with each of said kinescopes for producing a two-dimensional deflection of the electron beam therein, at least one of said deflecting means having first and second magnetic-field producing windings disposed on opposite sides of the electron beam path of said first named kinescope, substantially equal damping resistors connected respectively in shunt with said first and second windings, and a corrective resistor connected in shunt with said first winding only to cause less current to flow in said first winding than in said second winding to cause the magnetic field on one side of said beam path to differ from the magnetic field on the other side of said beam path thereby to alter the shape of the raster produced by said two-dimensional deflection of the electron beam of said first named kinescope in an amount equal to and opposite from said image registration error to provide corrective compensation for said error.

6. The structure according to claim 5 in which said corrective resistor is variable to provide controllable corrective compensation for said error.

7. Color television image reproducing apparatus of the type in which component color images are projected onto a viewing screen in register, said apparatus comprising: a plurality of image-producing kinescopes, each having a target and means for directing an electron beam along a path toward such target; means operatively connected to said kinescopes for modulating said electron beams respectively with video signals representative of said different component color images; an optical projection system for projecting the images produced by said kinescopes substantially in register onto said viewing screen, at least one of said kinescopes being positioned such that the optical axis of its projected image is at an angle with respect to the perpendicular to the plane of said viewing screen thereby causing an image-registration error between the image produced by said kinescope and the image produced by a kinescope whose projected optical axis is normal to said plane; vertical and horizontal deflecting means associated with each of said kinescopes for producing a two-dimensional deflection of the electron beam therein, at least one of said deflecting means having first and second magnetic-field producing windings disposed on opposite sides of the electron beam path of said first named kinescope, and first and second resistance means connected respectively in shunt with said first and second windings to damp unwanted oscillations in said windings, the resistance means connected in shunt with said first winding having a smaller value than the resistance means connected in shunt with said second winding to cause less current to flow in said first winding than in said second winding to cause the magnetic field on one side of said beam path to differ from the magnetic field on the other side of said beam path thereby to alter the shape of the raster produced by said two-dimensional deflection of the electron beam of said first named kinescope in an amount equal to and opposite from said image registration error to provide corrective compensation for said error.

References Cited in the file of this patent

UNITED STATES PATENTS

| | | |
|---|---|---|
| 2,654,854 | Sericht | Oct. 6, 1953 |
| 2,706,216 | Lesti | Apr. 12, 1955 |
| 2,744,951 | Gibson | May 8, 1956 |
| 2,869,026 | Sanford | Jan. 13, 1959 |